(12) United States Patent
Fan et al.

(10) Patent No.: US 9,340,433 B2
(45) Date of Patent: May 17, 2016

(54) TITANIUM OXIDE SPACING BY SIP

(75) Inventors: Xiaowu Fan, Fountain Valley, CA (US);
Jinzhen Shi, Fountain Valley, CA (US);
Ming-ren Tarng, Irvine, CA (US);
Dong-Keun Lee, Skokie, IL (US);
Phillip B. Messersmith, Clarendon Hills, IL (US)

(73) Assignees: Behr Process Corporation, Santa Ana, CA (US); Northwestern University, Evanston, IL (US)

( * ) Notice: Subject to any disclaimer, the term of this patent is extended or adjusted under 35 U.S.C. 154(b) by 0 days.

(21) Appl. No.: 13/095,300

(22) Filed: Apr. 27, 2011

(65) Prior Publication Data
US 2012/0277346 A1     Nov. 1, 2012

(51) Int. Cl.
| | |
|---|---|
| *C08K 9/10* | (2006.01) |
| *C09D 7/12* | (2006.01) |
| *C09C 1/36* | (2006.01) |
| *C01G 23/047* | (2006.01) |
| *C09D 5/02* | (2006.01) |
| *B82Y 30/00* | (2011.01) |

(52) U.S. Cl.
CPC ............... *C01G 23/047* (2013.01); *B82Y 30/00* (2013.01); *C08K 9/10* (2013.01); *C09C 1/3676* (2013.01); *C09C 1/3692* (2013.01); *C09D 5/028* (2013.01); *C09D 7/1225* (2013.01); *C01P 2002/88* (2013.01); *C01P 2004/04* (2013.01); *C01P 2004/62* (2013.01); *C01P 2004/64* (2013.01); *C01P 2004/84* (2013.01); *C09C 1/3661* (2013.01); *C09C 1/3684* (2013.01)

(58) Field of Classification Search
CPC ...... C09C 1/3676; C09C 1/3692; C08K 9/10; C09D 7/1225

USPC .................................. 428/407; 523/202, 205
See application file for complete search history.

(56) References Cited

U.S. PATENT DOCUMENTS

| | | | |
|---|---|---|---|
| 3,393,165 | A | 7/1968 | Evans et al. |
| 3,929,502 | A | 12/1975 | Hodgkin et al. |
| 5,352,481 | A | 10/1994 | Bak et al. |

(Continued)

FOREIGN PATENT DOCUMENTS

| | | |
|---|---|---|
| EP | 2 298 694 A1 | 3/2011 |
| GB | 743630 A | 12/1953 |

(Continued)

OTHER PUBLICATIONS

Wang, W. et al., "A Facile Strategy to Modify TiO2 Nanoparticles via Surface-Initiated ATRP of Styrene," J. of Polymer Science: Part A: Polymer Chemistry, V. 48, pp. 1782-1790 (2010).

(Continued)

*Primary Examiner* — Vickey Nerangis
(74) *Attorney, Agent, or Firm* — Brooks Kushman P.C.

(57) ABSTRACT

A method of making a titanium oxide-containing coating composition comprises attaching an initiator to a pretreated titanium oxide to form an initiator/pretreated titanium oxide complex. The pretreated titanium oxide includes a plurality of pretreated titanium oxide particles which are titanium oxide particles that are pretreated with at least one metal oxide. The initiator/pretreated titanium oxide complex is contacted with a polymerizable unsaturated monomer such that a polymeric encapsulate forms on the initiator/pretreated titanium oxide particles to form polymeric encapsulated titanium oxide particles.

20 Claims, 3 Drawing Sheets

(56) References Cited

U.S. PATENT DOCUMENTS

| | | |
|---|---|---|
| 5,534,193 A | 7/1996 | Jacobson |
| 6,733,884 B2 * | 5/2004 | Brown ............ 428/404 |
| 7,288,146 B1 | 10/2007 | Nicolai et al. |
| 7,727,323 B2 | 6/2010 | Tarng et al. |
| 2003/0051635 A1 * | 3/2003 | Sankara Subramanian et al. ............ 106/437 |
| 2006/0009546 A1 | 1/2006 | Brown |
| 2007/0212312 A1 | 9/2007 | Kuwahara et al. |
| 2007/0218049 A1 | 9/2007 | Chen et al. |
| 2007/0298259 A1 | 12/2007 | Matsumoto |
| 2009/0148605 A1 | 6/2009 | Akhtar et al. |
| 2010/0030414 A1 | 2/2010 | Watanabe et al. |
| 2010/0326322 A1 | 12/2010 | King et al. |

FOREIGN PATENT DOCUMENTS

| | | |
|---|---|---|
| GB | 1266197 A | 3/1972 |
| GB | 1328136 A | 8/1973 |
| WO | 95/12638 A1 | 5/1995 |
| WO | 2008/064999 A2 | 6/2008 |
| WO | 2009/024497 A1 | 2/2009 |
| WO | WO 2009087021 A1 * | 7/2009 |

OTHER PUBLICATIONS

Kong, N. Y. et al., "Photocatalytic Antibacterial Capabilities of $TiO_2$—Biocidal Polymer Nanocomposites Synthesized by a Surface-Initiated Photopolymerization," Environmental Sci. & Tech., v. 44, n. 14, pp. 5672-5676, 2010.

Fan, X. et al, "Surface-initiated polymerization from $TiO_2$ nanoparticle surfaces through a biomimetic initiator: A new route toward polymer-matrix nanocomposites," Composites Science and Technology 66, 2006), pp. 1195-1201.

Extended Search Report dated Oct. 31, 2012 in EP 12 16 4683, filed Apr. 19, 2012, 3 pgs.

* cited by examiner

TITANIUM OXIDE SPACING BY SIP

TECHNICAL FIELD

In at least one aspect, the present invention relates to components for paint compositions, and in particular, to titanium oxide particles with improved spacing properties for such paint compositions.

BACKGROUND

Coating compositions such as paints typically include pigments such as titanium oxide in order to enhance visual hide and provide aesthetic effect. The typical coating composition includes a pigment and other solid components dispersed within in a liquid. For example, most paints include a film forming material or binder along with the pigment dispersed within a solvent.

In a paint composition, the pigment is desirably dispersed in the liquid component. When the paint is applied to a substrate, the solvent evaporates leaving behind the solid components. In particular, the pigment and binder coalesce to form a continuous film. The spacing of the pigment particles is important in determining the characteristics of the paint coating. Uniform dispersion of the particles in the final coating is most desirable. Non-uniform dispersion caused by flocculation and/or settling of the pigment phase may result in several undesirable properties such as a non-uniform appearance and spotty coverage. In each of these mechanisms, pigments tend to cling together by agglomerating or clustering. Moreover, in such instances the pigment particles tend to resist subsequent re-dispersion by agitation. This reduces the hiding power of the resulting paint. Hiding power is among one of the most important attributes of paint, and hiding power is determined particularly in white paint by the light scattering effectiveness of the pigment. The light scattering effectiveness of the pigment is in turn highly dependent on the spacing arrangement of the pigment in the dried coating as well as the particle sizes.

Titanium dioxide is perhaps the most widely used pigment in paint applications. However, in order to improve the masking properties of paint compositions, the titanium dioxide must be pretreated with various oxides. Such pretreatment adds to the cost of the titanium oxide making it relatively expensive in comparison to the costs of other paint components. Therefore, there is a need to maximize the beneficial aspects of titanium dioxide, while minimizing the amount used. Enhanced light scattering occurs when the titanium dioxide pigment particles have a diameter of about 200 to 300 nm and are uniformly spaced about the same distance apart. Most commonly, particulate $T_iO_2$ in the range of 100 nm to 400 nm is utilized in conventional paint. Several prior art methods exist for improving the dispersion of pigments in paints. Various techniques have been attempted and used in the art to promote an even spacing and distribution of the pigment in the coating. For example, "extender" pigments have been used to increase pigment spacing. U.S. Pat. No. 7,727,323 provides another method is which nano-sized zinc oxide particles are used to decrease flocculation. Although these techniques work reasonably well, improvements to further reduce flocculation are still desired.

Accordingly, there is a need for titanium oxide paint compositions with improved processing characteristics and reduced costs.

SUMMARY OF THE INVENTION

The present invention solves one or more problems of the prior art by providing in at least one embodiment a method of making a titanium oxide-containing coating composition and in particular, a paint composition. The method comprises attaching initiators to pretreated titanium oxide particles to form initiator/pretreated titanium oxide complexes. The pretreated titanium oxide particles are titanium oxide particles that are pretreated with at least one metal oxide (e.g. silicon oxides, aluminum oxides, zirconium oxides), and typically used in paint and plastics industries as white pigment. The initiator/pretreated titanium oxide complexes are contacted with a polymerizable unsaturated monomer such that a polymeric encapsulate forms on the initiator/pretreated titanium oxide particles to form polymeric encapsulated titanium oxide particles. The polymeric encapsulated titanium oxide particles are then combined with a liquid-containing composition to form the titanium oxide-containing coating composition.

In another embodiment, a coating composition is provided. The coating composition includes a liquid-containing composition and an encapsulated titanium oxide dispersed in the liquid-containing composition. As set forth above, the titanium oxide-containing coating composition also includes residues of an initiator attached to the surface of the pretreated titanium oxide particles. Characteristically, the initiator includes a moiety for initiating atom transfer radical polymerization (ATRP). A polymeric layer is disposed over "(grafted from)" the pretreated titanium oxide particles and the residues of the initiator.

The method of the present embodiment relies upon surface-initiated polymerization (SIP) to form a polymeric encapsulant. SIP involves the attachment of a polymerization initiator to a pigment particle surface by chemisorption and or physical adsorption as the first step, followed by an in situ polymerization with the initiator modified pigment, a monomer, and a polymerization medium so that polymer chains are grown in situ from the pigment surface. The SIP product is a pigment particle grafted with a thick polymer shell around it with controllable thickness and functionality. If such SIP modified pigment particles are applied in a coating composition, the pigment spacing can be greatly improved from the steric effect due to the grafted thick polymer shell. For example, when SIP modified titanium oxide is used, the titanium oxide savings is estimated at 10% less for equal hiding ability. Furthermore, SIP adds more controllability, flexibility, and versatility over traditional surface treatment by controlling SIP processes with graft density, polymer molecular weight, polymer composition and architecture, end and side functional groups, etc. Therefore, it is much easier to tailor-make a pigment with highly specific surface treatment. The application of SIP provides thicker polymer shells around pigment particles which renders better pigment spacing, leading to improved hiding and a raw material saving. Furthermore, the polymer shell's thickness, density, and functionality can be controlled and tailored for different applications thereby offering flexibility with respect to pigment surface functionality. For example, the thickness of polymeric encapsulation is readily adjusted by controlling the duration of a living (e.g. anionic polymerization) or controlled (e.g. ATRP) SIP. Moreover, the hydrophobic or hydrophilic properties of the encapsulated pigment surface can be easily controlled by grafting either a hydrophobic or a hydrophilic polymer shell, and further fine-tuned by copolymer shells via copolymerizing hydrophobic/hydrophilic monomers at different ratios in the SIP process.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "residue" as used herein refers to the chemical moiety that remains after a chemical reaction has occurred.

Figure 1:
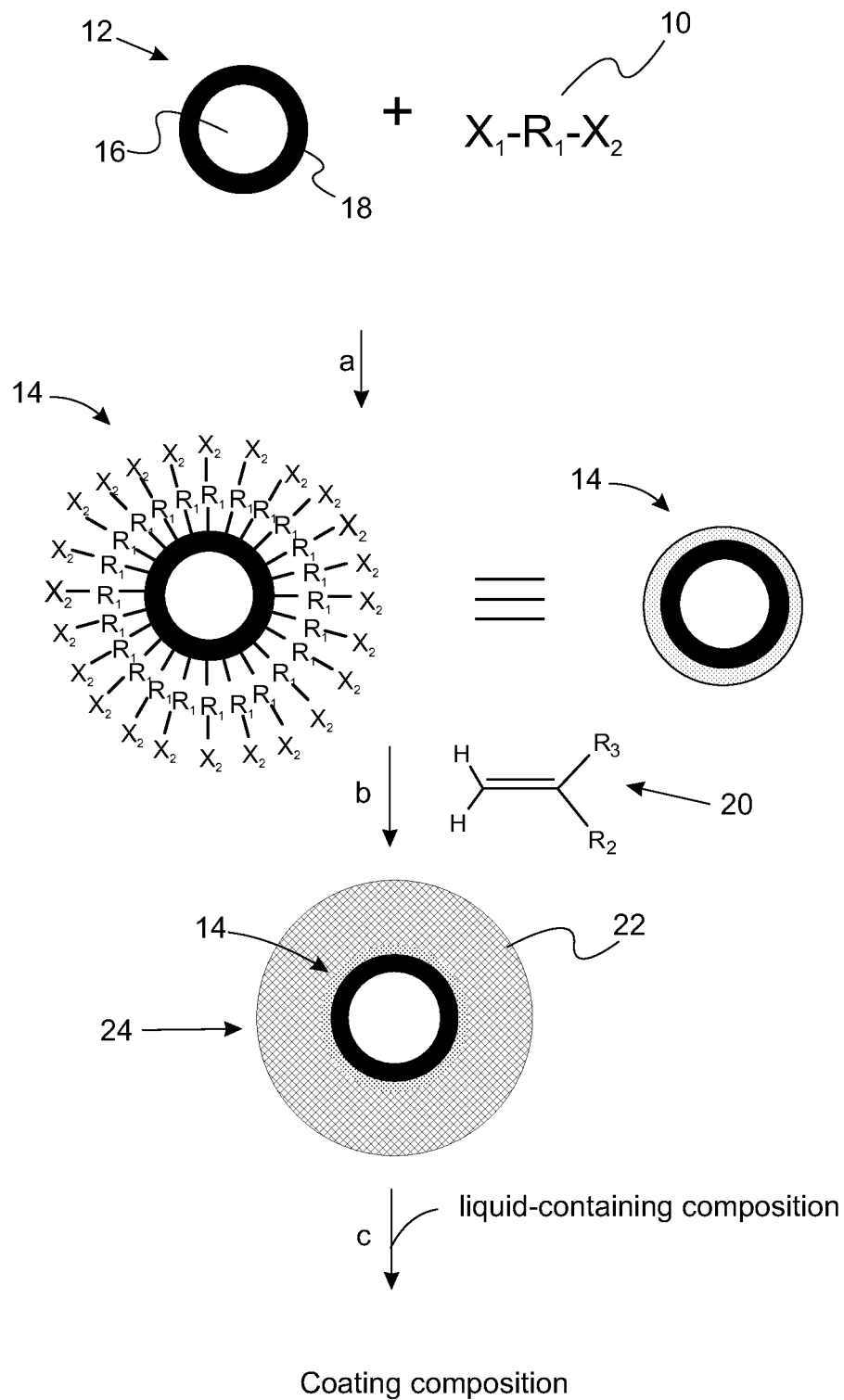
FIG. 1 is a flowchart illustrating a method of forming a paint composition.

With reference to FIG. 1, a schematic flowchart illustrating a method for making a titanium oxide-containing coating composition is provided. In step a), initiators 10 are attached to pretreated titanium oxide particles 12 to form initiator/pretreated titanium oxide complexes 14. Characteristically, the pretreated titanium oxide particles have an average spatial dimension from about 0.05 to about 1 microns. In another refinement, the pretreated titanium oxide particles have an average spatial dimension from about 100 nanometers to about 400 nanometers. The pretreated titanium oxide is a titanium oxide that is pretreated with at least one metal oxide. Examples of useful metal oxides for pretreatment include, but are not limited to, silicon oxides, aluminum oxides, zirconium oxides, and combinations thereof. Typically, this fixing of the initiator to the pretreated titanium oxide particles is accomplished by effectively dispersing the particles in a solvent (e.g. toluene, water, alkanes). The dispersion of the solvent may be accomplished by mechanical stirring and/or ultrasonication. Moreover, the temperature of the reaction may be carried out at room temperature (i.e., 25° C.). Typically, a useful temperature range is from 0° C. to about 100° C. The selection of the solvent is typically anhydrous and dependent on the nature of the initiator and must not interfere with its reaction with the metal oxide pretreatment layer on titanium oxide particles to any significant degree. Pretreated titanium oxide particles 12 are titanium oxide particles 16 that are pretreated with at least one metal oxide 18.

In step b), initiator/pretreated titanium oxide complexes 14 are contacted with polymerizable unsaturated monomer 20 such that polymeric encapsulant 22 forms on the initiator/pretreated titanium oxide particles to form polymeric encapsulated titanium oxide particles 24. This polymerization is carried out in a solvent and in the presence of a catalyst in the form of solution polymerization. Examples of suitable solvents include, but are not limited to, toluene, 1,4-dioxane, xylene, anisole, N,N-dimethylformamide, dimethyl sulfoxide, DMSO, water, methanol, ACN, chloroform, bulk monomer or mixtures thereof. The form of polymerization includes, but is not limited to, solution polymerization, bulk polymerization, suspension polymerization, emulsion polymerization and their variations. In a refinement, the polymeric layer (i.e., the polymeric encapsulant) has an average thickness from about 10 nanometers to about 500 nanometers.

In a refinement, the reaction temperature ranges from about 25° C. to about 140° C. The duration of the polymerization depends on the desired thickness of the final encapsulant. Typically, the polymerization is allowed to process for a time of 0.5 hours to 48 hours. The polymeric encapsulated titanium oxide particles are then combined in step c) with a liquid-containing composition to form the titanium oxide-containing coating composition.

As set forth above, the polymerization that leads to the formation of the polymeric encapsulant proceeds by atom transfer radical polymerization. In a refinement of the present embodiment, the initiator of this process (initiator 10) includes a first moiety, alkoxy silane, for attaching to the pretreated titanium oxide and a second moiety, phenyl/alkyl halide, for initiating radical polymerization, and in particular atom transfer radical polymerization. An example of such an initiator is provided by the following formula:

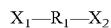

$X_1$ is a first moiety that allows attachment of the initiator to the surface of the pretreated titanium oxide for initiating polymerization, and in particular, for initiating surface-initiated polymerization (SIP). In one refinement, $X_1$ is or includes a leaving group that is replaced by chemically active functional groups on the pretreated titanium oxide surface (e.g., hydroxyl groups). Examples for $X_1$, include, but are not limited to, $C_1$-$C_{10}$ alkoxysilanes. $X_2$ is a second moiety that allows initiation of the polymerization reaction. In a refinement, $X_2$ is a halogen. For this purpose, bromine and chlorine are particularly useful selections for $X_2$. In this regard, the initiator allows for the formation of the following radical in the presence of a catalyst:

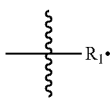

$R_1$ is a $C_6$-$C_{20}$ hydrocarbon-containing group. In a refinement, $R_1$ includes one or more phenyl groups. In another refinement, $R_1$ includes 1 to 3 phenyl groups. In still another refinement, $R_1$ includes one or more $C_1$-$C_{10}$ alkyl groups. In addition, $R_1$ may include a number of functional groups such as $C_1$-$C_{10}$ alkyl, $C_1$-$C_{10}$ alkyl, ester, nitrile, benzyl, amide, ether, amino, $C_1$-$C_4$ epoxy, hydroxyl, carboxylate, vinyl, and their combinations. An example of a useful initiator is provided by the following formula:

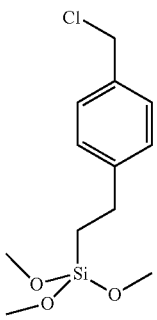

As set forth above, the polymeric encapsulant is formed from an unsaturated monomer that is capable of undergoing radical polymerization, and in particular atom transfer radical polymerization. In a refinement, the monomer is a vinylically unsaturated monomer as set forth in the following formula:

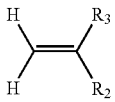

wherein:
$R_2$ and $R_3$ are each independently hydrogen, $C_1$-$C_{10}$ alkyl, CO—$NH_2$, $CO_2H$, $CO_2R$, phenyl, CN, pyridine, $C_6$-$C_{18}$ aryl or heteroaryl, and the like; and R is $C_1$-$C_{10}$ alkyl. In addition, these selections for $R_1$ and $R_2$ may also be substituted by $C_1$-$C_{10}$ alkyl, $C_1$-$C_{10}$ alkyl, amino, $C_1$-$C_4$ epoxy, hydroxyl, carboxylate, and vinyl. Examples of useful substituents include but are not limited to specific examples of unsaturated monomer include, but are not limited to, styrenes, acrylates, methacrylates, acrylonitriles, (meth)acrylamides, vinyl pyridines, vinyl phosphates, methyl-N-propanesulfonic acids, methacrylic acids, and combinations thereof.

As set forth above, the atom transfer polymerization step is carried out with a catalyst that is a transition metal complex formed by an amine, imine, or pyridine based ligand. The transition metal center must have at least two oxidation states and must be capable of interacting with a halogen (and in particular bromine and chlorine). Examples of useful transition metal compounds include copper-containing halides such as copper(I) chloride (CuCl) and copper(I) bromide (CuBr). The ligand must be able to solubilize the transition metal salt in polymerization solvent and to tune the catalyst for a well controlled polymerization. Examples of useful ligands include nitrogen-containing ligands such as N,N,N', N',N''-Pentamethyldiethylenetriamine (PMDETA), 1,1,4,7, 10,10-Hexamethyltriethylenetetramine (HMTETA), and 2,2'-bipyridine.

The coating composition also includes a liquid-containing composition. The liquid composition usually includes a binder which is the film forming component of the composition. Examples of suitable binders include, but are not limited to, alkyds, acrylics, vinyl-acrylics, vinyl acetate/ethylene (VAE), polyurethanes, polyesters, melamine resins, epoxy, or oils. In addition, the liquid-containing composition also includes one or more of the following components: water, solvent, thickeners, dispersants, surfactants, defoamers, additives, and combinations thereof.

The following examples illustrate the various embodiments of the present invention. Those skilled in the art will recognize many variations that are within the spirit of the present invention and scope of the claims.

As shown in step a) of FIG. 1, an initiator is attached onto the pretreated titanium oxide surface as follows. A commercially available chlorine-terminated silane compound ((chloromethyl)phenylethyl)trimethoxysilane (purchased from Gelest Inc. Product code SIC2295.5) was selected for surface-initiated atom transfer radical polymerization (SI-ATRP). In the initiator incorporation process, 0.5 g silica/alumina pretreated titanium oxide (provided by Kronos™ Worldwide Inc. Product code Kronos™ 2081) is dispersed in 15 mL toluene with 2 hrs stirring and 15 min ultrasonication to achieve a homogeneous dispersion. A predetermined amount of silane initiator was added in the titanium oxide dispersion. Then, the mixture was stirred for 6 hrs and kept at 100° C. overnight. The final titanium oxide-initiator complex product was obtained after multiple washings by solvents and collection by centrifugation.

Figure 2:
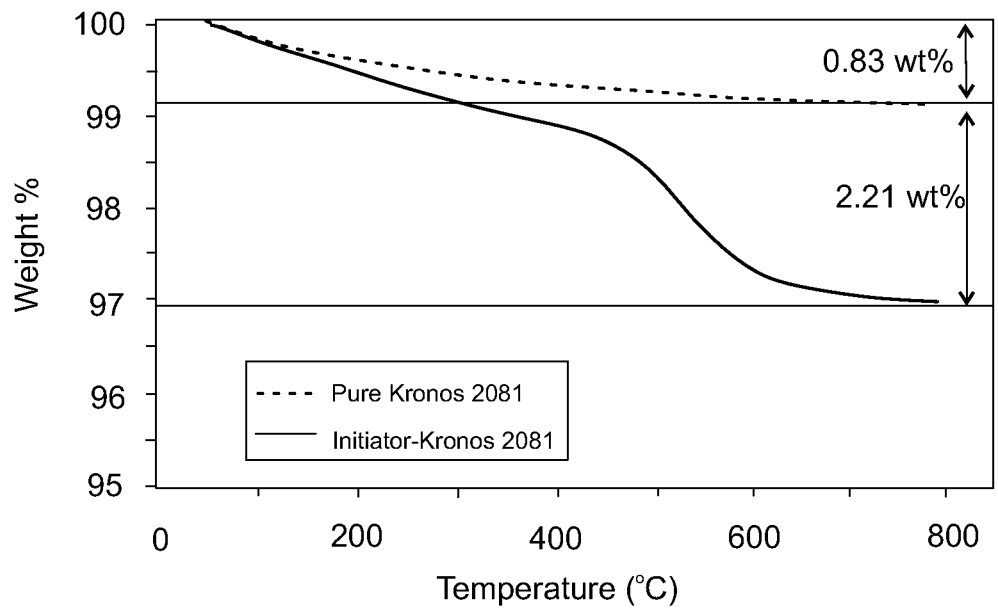
FIG. 2 provides thermal gravimetric analysis verifying initiator attachment to the titanium oxide particles.

Thermal gravimetric analysis (TGA) is used to verify initiator attachment and determine its content. In FIG. 2, weight losses of pure Kronos™ 2081 and initiator-modified Kronos™ 2081 are measured along with temperature increasing from room temperature to 800° C. TGA indicates that 2.21 wt % weight loss of initiator-pretreated titanium oxide is due to thermal decomposition of the organic silane initiator which was chemically attached to the titanium oxide surface. Fourier transform infrared (FTIR) spectroscopy, X-ray photoelectron spectroscopy (XPS), and Energy Dispersive X-ray (EDX) analysis also demonstrate the successful initiator incorporation onto the titanium oxide surface.

As shown in step b) of FIG. 1, methyl methacrylate (MMA) monomer is polymerized by SI-ATRP from the surface-attached initiator to yield PMMA encapsulation around titanium oxide. In a typical SIP reaction, 100 mg initiator-pretreated Kronos™ 2081 was dispersed in 5 mL N,N-dimethylformamide (DMF) solvent in a glass vessel, followed by 5 min ultrasonication. This dispersion is purged under argon gas flow for 1 hour. In a second vessel, 9 mg CuCl, 2.4 mg CuCl$_2$, 18.75 µL N,N,N',N',N"-pentamethyldiethylenetriamine (PMDETA, CuCl, CuCl$_2$, and PMDETA are catalysts for ATRP), and 10 mL of MMA monomer is dissolved in 5 mL DMF solvent, followed by 1 hour purging under argon gas flow. After purging, the catalysts and monomer solution are transferred to the first reaction vessel containing initiator/pretreated titanium oxide dispersion by a syringe. The final polymerization mixture was heated to 100° C. and kept for 23 hrs under constant stirring and argon protection. After polymerization, the product was purified by multiple solvent-washing (three times by DMF, twice by tetrahydrofuran (THF), and once by acetone) and centrifugation (9000 rpm for 10 min) cycles to remove residue monomer, catalysts, and free polymer. Finally, the PMMA-encapsulated titanium oxide product was collected after drying by lyophilizer overnight as a white solid sample.

Figure 3:
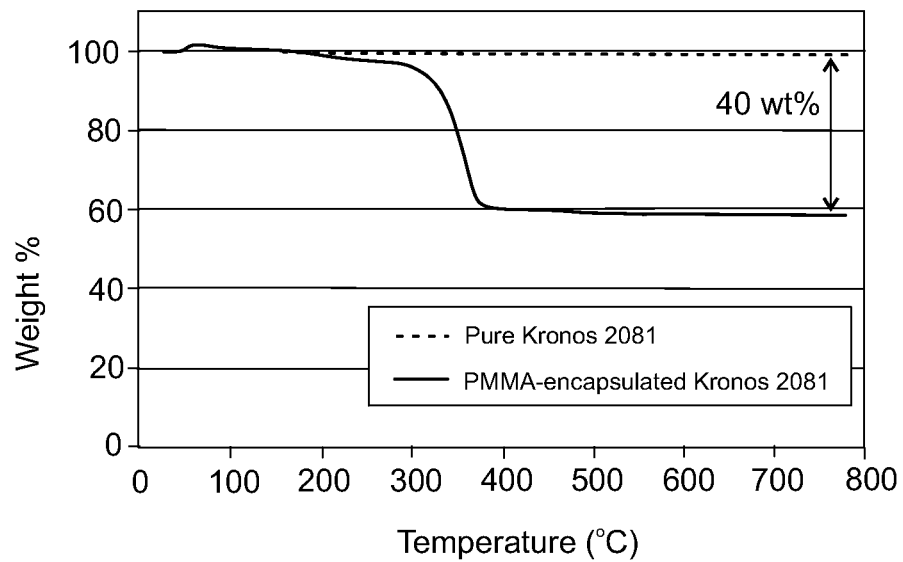
FIG. 3 provides thermal gravimetric analysis results demonstrating the polymer content of encapsulated titanium oxide.
Figure 4:
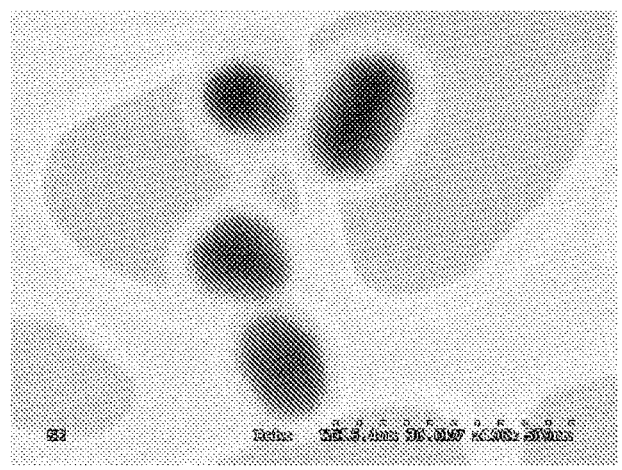
FIG. 4 provides a STEM image demonstrating the core-shell structure of PMMA-encapsulated titanium oxide with estimated polymer shell thickness at around 50 nm.

The polymer-encapsulated titanium oxide product from the above described SIP was analyzed by TGA and scanning transmission electron microscopy (STEM). TGA curves in FIG. 3 show that pure Kronos™ 2081 has only about 1 wt % weight loss while PMMA-encapsulated titanium oxide has about 41 wt % weight loss. Therefore, the polymer content of this sample is estimated to be 40 wt %. STEM image in FIG. 4 clearly demonstrates the core-shell structure of PMMA-encapsulated titanium oxide with estimated polymer shell thickness at around 50 nm.

The versatility of the SIP approach is also examined and demonstrated by encapsulating titanium oxide with different polymers under rather mild and environmental friendly polymerization conditions. As mentioned above as one of the advantages of SIP, the hydrophobic or hydrophilic properties of the encapsulated pigment surface can be easily controlled by grafting either a hydrophobic or a hydrophilic polymer shell. As hydrophobic PMMA encapsulation has been demonstrated by the previous example, in the following example, a methacrylate monomer with a hydrophilic oligo (ethylene glycol) moiety is polymerized from initiator/attached titanium oxide under ambient temperature in an aqueous solvent. The hydrophilic methacrylate monomer (purchased from Aldrich, product number 409537) has the chemical formula H$_2$C=C(CH$_3$)COO(CH$_2$CH$_2$O)$_6$H. TGA measurements of this hydrophilic polymer encapsulated titanium oxide sample indicated the polymeric content is about 12 wt % and the polymer shell thickness is estimated at around 20 nm.

Table 1 provides a comparison of paint compositions which include the encapsulated titanium oxide particles described above with a control using an unencapsulated titanium oxide. It is noteworthy that the prototype composition does not require a dispersant because the polymeric encapsulation serves as more efficient dispersant for improved dispersion and spacing of titanium oxide particles.

TABLE 1

Semigloss white paint compositions

| Paint Ingredients | Control composition using conventional titanium oxide (wt %) | Prototype composition using polymer encapsulated titanium oxide (wt %) |
|---|---|---|
| Titanium oxide | 21.7 | 43.5* |
| Water | 27.1 | 27.1 |
| Solvent | 4.1 | 5.0*** |
| Binder | 39.1 | 17.3** |
| Thickener | 6.0 | 6.0 |
| Dispersant | 0.9 | 0.0*** |
| Surfactant | 0.6 | 0.6 |

TABLE 1-continued

Semigloss white paint compositions

| Paint Ingredients | Control composition using conventional titanium oxide (wt %) | Prototype composition using polymer encapsulated titanium oxide (wt %) |
|---|---|---|
| Defoamer | 0.1 | 0.1 |
| Additives | 0.4 | 0.4 |
| Total | 100.0 | 100.0 |

*Assuming encapsulated titanium oxide has 50 wt % polymer and 50 wt % titanium oxide, loading of pure titanium oxide in the prototype composition is the same as that of the control composition at 21.7 wt %.
**Binder (resin polymer) in the prototype composition is reduced accordingly because encapsulated titanium oxide has polymer already.
***In the prototype composition, encapsulated titanium oxide does not need dispersant due to the presence of its polymer shell that can result in better titanium oxide dispersion. Thus, 0.6 wt % dispersant loading is removed, and solvent loading increases to 5.0 wt % (4.1 wt % + 0.9 wt %).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An encapsulated titanium oxide for coating compositions, the encapsulated titanium oxide consisting of a plurality of pretreated titanium oxide particles, residues of an initiator attached to surfaces of the pretreated titanium oxide particles, and a polymeric layer disposed over the pretreated titanium oxide particles and the residues of the initiator, the polymeric layer consisting of polymer chains that extend from surfaces of the pretreated titanium oxide particles, the polymer chains consisting of residues of a hydrophilic monomer and optionally residues of a hydrophobic monomer, wherein:
the pretreated titanium oxide particles are titanium oxide particles pretreated with at least one metal oxide;
the initiator has the following formula

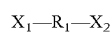

wherein:
X$_1$ is a leaving group that is replaced by chemically active functional groups on the surfaces of the pretreated titanium oxide particles;
R$_1$ is a C$_6$-C$_{20}$ hydrocarbon-containing group consisting of components selected from the group consisting of phenyl groups, C$_1$-C$_{10}$ alkyl groups, C$_1$-C$_{10}$ allyl, ester, nitrile, benzyl, ether, C$_1$-C$_4$ epoxy, hydroxyl, vinyl, and combinations thereof; and
X$_2$ is a halogen.

2. The encapsulated titanium oxide of claim 1 wherein the metal oxide comprises a component selected from the group consisting of silicon oxides, aluminum oxides, zirconium oxides, and combinations thereof.

3. The encapsulated titanium oxide of claim 1 wherein the polymeric layer has an average thickness from about 10 nanometers to about 500 nanometers and the pretreated titanium oxide particles have an average spatial dimension from about 0.05 to about 1 microns.

4. The encapsulated titanium oxide of claim 1 wherein the polymeric layer includes residues of a component selected from the group consisting of styrenes, acrylates, methacrylates, acrylonitriles, (meth)acrylamides, vinyl pyridines, vinyl phosphates, methyl-N-propanesulfonic acids, methacrylic acids, and combinations thereof.

5. The encapsulated titanium oxide of claim wherein $X_1$ is a $C_1$-$C_{10}$ alkoxysilane.

6. The encapsulated titanium oxide of claim 1 wherein $R_1$ includes one or more phenyl groups.

7. The encapsulated titanium oxide of claim 1 wherein the initiator has the following formula:

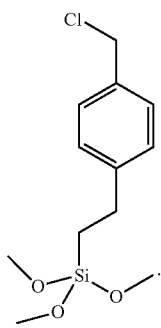

8. The encapsulated titanium oxide of claim 1 wherein the polymer chains consist of residues of a hydrophilic monomer and residues of a hydrophobic monomer.

9. The encapsulated titanium oxide of claim 1 wherein the hydrophilic monomer is $H_2C\!=\!C(CH_3)COO(CH_2CH_2O)_6H$.

10. A coating composition comprising:
a liquid-containing composition;
an encapsulated titanium oxide dispersed in the liquid-containing composition, the encapsulated titanium oxide consisting of a plurality of pretreated titanium oxide particles, residues of an initiator attached to surfaces of the pretreated titanium oxide particles, and a polymeric layer disposed over the pretreated titanium oxide particles and the residues of the initiator, the polymeric layer consisting of polymer chains that extend from surfaces of the pretreated titanium oxide particles, the polymer chains consisting of residues of a hydrophilic monomer and optionally residues of a hydrophobic monomer, wherein:
the pretreated titanium oxide particles are titanium oxide particles pretreated with at least one metal oxide;
the initiator has the following formula $$X_1\!-\!R_1\!-\!X_2$$

where:
$X_1$ is a leaving group that is replaced by chemically active functional groups on the surfaces of the pretreated titanium oxide particles;
$R_1$ is a $C_6$-$C_{20}$ hydrocarbon-containing group consisting of components selected from the group consisting of phenyl groups, $C_1$-$C_{10}$ alkyl groups, $C_1$-$C_{10}$ allyl, ester, nitrile, benzyl, ether, $C_1$-$C_4$ epoxy, hydroxyl, vinyl, and combinations thereof; and
$X_2$ is a halogen.

11. The coating composition of claim 10 wherein the metal oxide comprises a component selected from the group consisting of silicon oxides, aluminum oxides, and combinations thereof.

12. The coating composition of claim 10 wherein the polymeric layer has an average thickness from about 10 nanometers to about 500 nanometers and the pretreated titanium oxide particles have an average spatial dimension from about 0.05 to about 1 microns.

13. The coating composition of claim 10 wherein the polymeric layer includes residues of a component selected from the group consisting of styrenes, acrylates, methacrylates, acrylonitriles, (meth)acrylamides, vinyl pyridines, vinyl phosphates, methyl-N-propanesulfonic acids, methacrylic acids, and combinations thereof.

14. The coating composition of claim 10 wherein the liquid-containing composition includes a binder.

15. The coating composition of claim 14 wherein the liquid-containing composition further comprises a component selected from the group consisting of water, solvent, thickeners, dispersants, surfactants, defoamers, additives, and combinations thereof.

16. The coating composition of claim 10 wherein $X_1$ is a $C_1$-$C_{10}$ alkoxysilane.

17. The coating composition of claim 10 wherein $R_1$ includes one or more phenyl groups.

18. The coating composition of claim 10 wherein the initiator has the following formula:

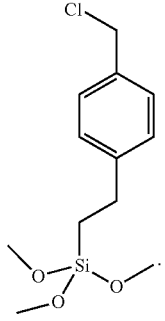

19. The coating composition of claim 10 wherein the polymer chains consist of residues of a hydrophilic monomer and residues of a hydrophobic monomer.

20. The coating composition of claim 10 wherein the hydrophilic monomer is $H_2C\!=\!C(CH_3)COO(CH_2CH_2O)_6H$.

* * * * *